(12) United States Patent
Fu et al.

(10) Patent No.: US 12,185,266 B2
(45) Date of Patent: Dec. 31, 2024

(54) SYNCHRONIZATION METHOD AND APPARATUS

(71) Applicant: GUANGDONG OPPO MOBILE TELECOMMUNICATIONS CORP., LTD., Guangdong (CN)

(72) Inventors: Zhe Fu, Dongguan (CN); Qianxi Lu, Dongguan (CN)

(73) Assignee: GUANGDONG OPPO MOBILE CORP., LTD., Guangdong (CN)

( * ) Notice: Subject to any disclaimer, the term of this patent is extended or adjusted under 35 U.S.C. 154(b) by 0 days.

(21) Appl. No.: 17/901,840

(22) Filed: Sep. 1, 2022

(65) Prior Publication Data

US 2022/0417883 A1    Dec. 29, 2022

Related U.S. Application Data

(63) Continuation of application No. PCT/CN2020/077483, filed on Mar. 2, 2020.

(51) Int. Cl.
*H04W 56/00* (2009.01)

(52) U.S. Cl.
CPC .............................. *H04W 56/0015* (2013.01)

(58) Field of Classification Search
CPC ........... H04W 56/0015; H04W 56/0045; H04J 3/0667; H04J 3/12; H04J 3/0638; H04J 3/0682; H04L 7/027
See application file for complete search history.

(56) References Cited

U.S. PATENT DOCUMENTS

| 2019/0174444 A1* | 6/2019 | Li ..................... H04W 56/0015 |
| 2019/0289561 A1 | 9/2019 | Corley et al. |

FOREIGN PATENT DOCUMENTS

| CN | 108988972 A | 12/2018 |
| CN | 109587784 A | 4/2019 |
| CN | 110324889 A | 10/2019 |
| CN | 110557823 A | 12/2019 |
| CN | 110662284 A | 1/2020 |
| CN | 110830202 A | 2/2020 |
| WO | 2013186981 A1 | 12/2013 |

(Continued)

OTHER PUBLICATIONS

3GPP TS 38.331 V15.8.0 (Dec. 2012); "3rd Generation Partnership Project; Technical Specification Group Radio Access Network; NR; Radio Resource Control (RRC) protocol specification (Release 15)", entire document.

(Continued)

*Primary Examiner* — Vineeta S Panwalkar
(74) *Attorney, Agent, or Firm* — Ladas & Parry, LLP

(57) ABSTRACT

Embodiments of the present application provide a synchronization method and apparatus, and the method includes: performing clock synchronization according to first clock information or second clock information. By determining that the clock synchronization is performed according to the first clock information or the second clock information, it is possible to effectively determine an implementation of a terminal device for clock synchronization when system information and dedicated information exist at the same time, so as to ensure the clock synchronization between a network device and the terminal device.

12 Claims, 11 Drawing Sheets

(56) References Cited

FOREIGN PATENT DOCUMENTS

| WO | 2014126365 A1 | 8/2014 |
|---|---|---|
| WO | 2018057189 A1 | 3/2018 |

OTHER PUBLICATIONS

RAN1. "Reply LS on TSN requirements evaluation", R2-1900026, 3GPP TSG RAN WG2#105, Athens, Greece, Feb. 25-Mar. 1, 2019, entire document.

NTTDocomo, Inc, "Remaining issues on accurate reference timing delivery", R2-1915964, 3GPP TSG-RAN WG2 #108, Reno, US, Nov. 18-22, 2019, all pages.

ZTE Corporation, Sanechips, China Southern Power Grid Co., Ltd, "Signalling aspects for accurate reference timing delivery in TSC", R2-1908859, 3GPP TSG-RAN WG2 Meeting#107, Prague, Czech Republic, Aug. 26-30, 2019, all pages.

The Extended European search report of corresponding European application No. 20923384.0, dated Mar. 2, 2023.

The first Office Action of corresponding European patent application No. 20923384.0, dated Jul. 13, 2023.

International Search Report in the international application No. PCT/CN2020/077483, mailed on Dec. 7, 2020.

Written Opinion of the International Search Authority in the international application No. PCT/CN2020/077483, mailed on Dec. 7, 2020, all pages.

3GPP TS 38.331 V17.0.0 (Mar. 2022); 3rd Generation Partnership Project; Technical Specification Group Radio Access Network;NR; Radio Resource Control (RRC) protocol specification(Release 17), all pages.

3GPP TS 38.300 V17.0.0 (Mar. 2022); 3rd Generation Partnership Project; Technical Specification Group Radio Access Network;NR; NR and NG-RAN Overall Description;Stage 2(Release 17), all pages.

Oppo, Time Synchronization in IIoT, R2-1906044,3GPP TSG-RAN WG2 Meeting #106, Reno, US, May 13-May 17, 2019, all pages.

Nokia, Nokia Shanghai Bell,Summary of e-mail discussion: [105bis# 18][NR/IIoT] Synchronisation (Nokia), R2-1907193,3GPP TSG-RAN WG2 Meeting #106, Reno, USA, May 13-17, 2019, all pages.

The second Office Action of corresponding European application No. 20923384.0, dated Oct. 31, 2023.

Nokia, Nokia Shanghai Bell; Summary on accurate reference timing, R2-2002012; 3GPP TSG-RAN WG2 Meeting #109e; Elbonia, Online, Feb. 24-Mar. 6, 2020.

The first Office Action of corresponding Indian application No. 202217050823, dated Nov. 30, 2023.

The first Office Action of corresponding Japanese application No. 2022-552958, dated Jan. 23, 2024.

The first Office Action of corresponding Chinese patent application No. 202211529554.1, dated Jun. 25, 2024, with search report.

\* cited by examiner

SYNCHRONIZATION METHOD AND APPARATUS

CROSS-REFERENCE TO RELATED APPLICATIONS

This application is a continuation of International Application No. PCT/CN2020/077483, filed on Mar. 2, 2020, the disclosure of which is hereby incorporated by reference in its entirety.

TECHNICAL FIELD

The present application relates to communication technology, in particular to a synchronization method and apparatus.

BACKGROUND

Time sensitive network (TSN) can ensure reliable deterministic transmission through time synchronization and real-time data scheduling. Therefore, in TSN, clock synchronization between a terminal device and a network device is particularly important.

At present, in the prior art, a terminal device may receive system information and dedicated information from a network device to determine clock information according to the system information and the dedicated information, so that clock synchronization is realized, where a local oscillator of a gNB (5G Node B) may cause clock drift, and different transmission manners of the system information and the dedicated information will lead to a certain delay, where the clock drift and the transmission delay will cause clock information sent from the network device to the terminal device through the system information and the dedicated information to be different.

When the system information and the dedicated information exist at the same time, there is no effective solution regarding which clock information the terminal device should use for clock synchronization, so that the clock synchronization between the network device and the terminal device cannot be ensured.

SUMMARY

Embodiments of the present application provide a synchronization method and apparatus to avoid the problem that clock synchronization between a network device and a terminal device cannot be ensured.

In a first aspect, the embodiments of the present application provide a synchronization method, including:

performing clock synchronization according to first clock information or second clock information.

In a second aspect, the embodiments of the present application provide a synchronization apparatus, including:

a synchronizing module, configured to perform clock synchronization according to first clock information or second clock information.

In a third aspect, the embodiments of the present application provide a terminal device, including a transceiver, a processor and a memory;

the memory stores a computer executable instruction; and the processor executes the computer executable instruction stored in the memory to enable the processor to execute the synchronization method according to the first aspect.

In a fourth aspect, the embodiments of the present application provide a computer readable storage medium, and the computer readable storage medium stores a computer executable instruction which, when being executed by a processor, is used to realize the synchronization method according to the first aspect.

The embodiments of the present application provide a synchronization method and apparatus, and the method includes: performing clock synchronization according to first clock information or second clock information. By determining that the clock synchronization is performed according to the first clock information or the second clock information, it is possible to effectively determine an implementation manner of a terminal device for clock synchronization when the system information and the dedicated information exist at the same time, so as to ensure the clock synchronization between a network device and the terminal device.

DESCRIPTION OF EMBODIMENTS

Figure 1:
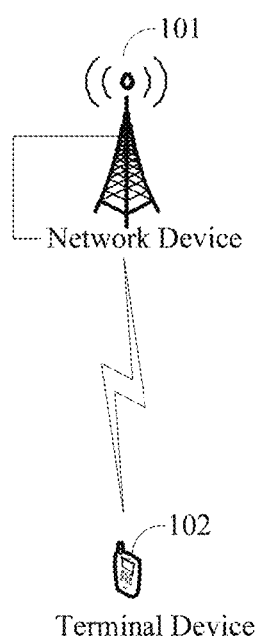
FIG. 1 is a schematic diagram of a communication scenario provided in an embodiment of the present application.

In order to facilitate understanding, concepts involved in the present application are first explained.

Terminal device: a device that includes wireless transceiver functions and can cooperate with a network device to provide a user with communication services. Specifically, the terminal device may refer to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. For example, the terminal device may be a cellular phone, a cordless phone, a session initiation protocol (SIP) phone, a wireless local loop (WLL) station, a personal digital assistant, a handheld device with wireless communication functions, a computing device or other processing devices connected to a wireless modem, an on-board device, a wearable device, a terminal device in a future 5G network or a network after the 5G network, etc.

Network device: the network device may be a device configured to communicate with the terminal device, for example, a base station in a global system for mobile communication (GSM) or a code division multiple access (CDMA) communication system, a NodeB (NB) in a wideband code division multiple access (WCDMA) system, or an evolutional Node B (eNB or eNodeB) in an LTE system, or the network device may be a relay station, an access point, an on-board device, a wearable device, a network side device in a future 5G network or a network after the 5G network, or a network device in a future evolved public land mobile network (PLMN) network, etc.

Time sensitive network: as a group of protocol suites at a data link layer, the time sensitive network (TSN) mainly includes IEEE 802.1AS, IEEE 802.1Qbv, IEEE 802.1Qci, IEEE 802.1Qcc, IEEE802.1Qch and other protocols, and changes uncertainty of Ethernet in the underlying architecture, changing the Ethernet into a deterministic network. According to sensitivity of different task data to time, TSN provides a common standard for managing time nodes and process sequences of information interaction. TSN has the advantages of bandwidth, security and interoperability, and can well meet the real-time data requirements in an industrial site. The preemption mechanism is an important working mechanism of TSN, and by processing critical data packets preferentially during transmission, the preemption mechanism ensures rapid transmission of such data.

The network device involved in the embodiments of the present application may also be called a radio access network (RAN) device. The RAN device is connected with the terminal device to receive data of the terminal device and send the data to a core network device. The RAN device corresponds to different devices in different communication systems, for example, the RAN device corresponds to a base station and a base station controller in a 2G system, corresponds to a radio network controller (RNC) in a 3G system, corresponds to an evolutionary Node B (eNB) in a 4G system, and corresponds to an access network device (e.g., gNB, central unit CU, and distribute unit DU) of a 5G system, such as NR, in the 5G system.

In addition, it should be understood that in the description of the present application, words such as "first" and "second" are only used for the purpose of distinguishing the description, and should not be understood as indicating or implying relative importance, nor as indicating or implying order, nor as indicating or implying an association between similar nouns.

In the following, with reference to FIG. 1, a scenario to which a communication method in the present application is applicable will be described.

FIG. 1 is a schematic diagram of a communication scenario provided in an embodiment of the present application; please refer to FIG. 1, which includes a network device 101 and a terminal device 102, wireless communication may be performed between the network device 101 and the terminal device 102.

Where the network including the network device 101 and the terminal device 102 may also be called a non-terrestrial network (NTN), where the NTN refers to a communication network between a terminal device and a satellite (also called a network device).

It can be understood that technical solutions of the embodiments of the present application can be applied to the New Radio (NR) communication technology, where NR refers to a new generation of radio access network technology, which can be applied to a future evolved network, e.g., the 5th generation mobile communication (5G) system in the future. The solutions in the embodiments of the present application can also be applied to other wireless communication networks such as Wireless Fidelity (WIFI) and Long Term Evolution (LTE), and corresponding names may also be substituted with corresponding names of functions in other wireless communication networks.

The network architectures and the service scenarios described in the embodiments of the present application are for the purpose of illustrating the technical solutions of the embodiments of the present application more clearly, and do not constitute a limitation on the technical solutions provided in the embodiments of the present application, persons skilled in the art should know that with the evolution of the network architectures and the emergence of new service scenarios, the technical solutions provided in the embodiments of the present application are also applicable to similar technical problems.

Based on the communication scenarios introduced above, technical background involved in the present application is further introduced in detail below:

in the 5G industrial Internet of things (IIoT), it is necessary to support propagation of services such as factory automation, transport industry, and electrical power distribution in the 5G system.

The services introduced above have strict requirements on delay and reliable propagation, therefore, a concept of TSN or time sensitive communication (TSC) is introduced into IIOT, where the TSN can ensure reliable and deterministic transmission through time synchronization and real-time data scheduling.

Figure 2:
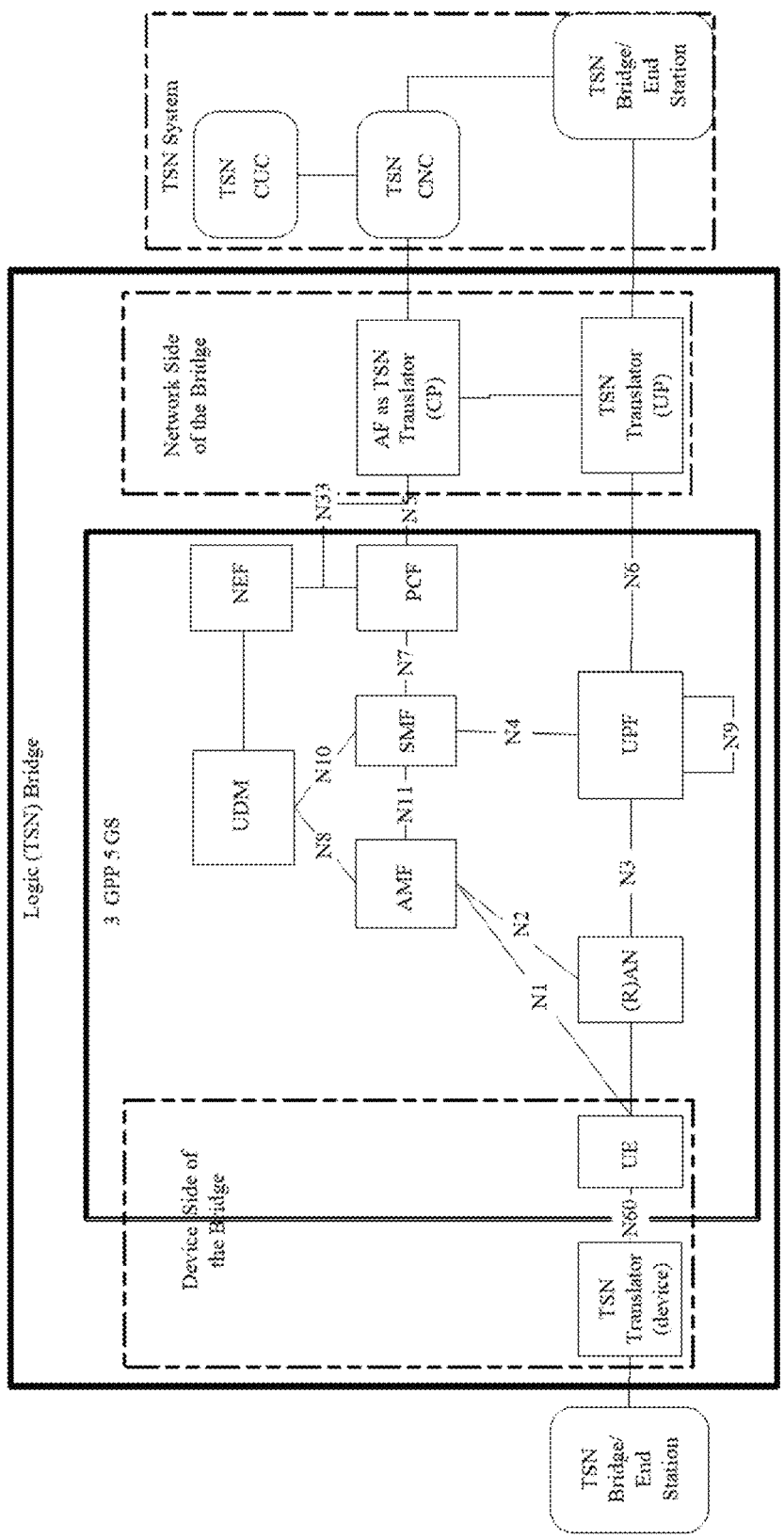
FIG. 2 is a schematic diagram of an implementation of a 5G network served as a TSN bridge provided in an embodiment of the present application.

In a TSN network, a 5G network may serve as a TSN bridge to provide services for the TSN network and services, where an implementation of the 5G network served as the TSN bridge may be, for example, as shown in FIG. 2, where FIG. 2 is a schematic diagram of an implementation of a 5G network served as a TSN bridge provided in an embodiment of the present application.

Referring to FIG. 2, the 5G network may serve as a TSN bridge.

In order to use the 5G network as the TSN bridge, an NR system needs to provide a guarantee of lower delay and higher clock synchronization accuracy, so that when factory automation services propagate in the 5G network, operations and connections of each point of mechanical operations are accurate and meet the clock requirements.

Figure 3:
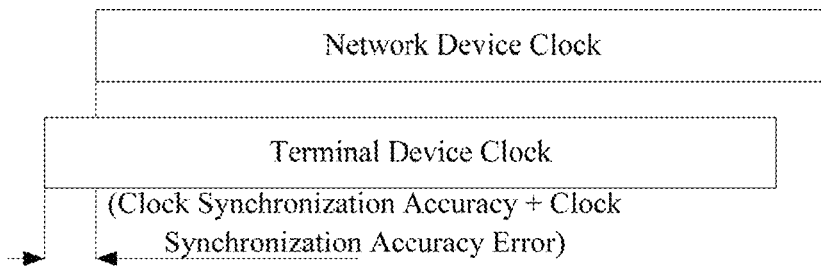
FIG. 3 is a schematic diagram of a timing relationship of clock synchronization between a terminal device and a network device provided in an embodiment of the present application.

TSN clock synchronization accuracy is described as follows:

based on the requirements of TSN service propagation, when a TSN service propagates in 5G, a clock synchronization accuracy requirement of 1 microsecond (us) needs to be met between a terminal device and a network device which execute the TSN service, specifically, whether the clock synchronization accuracy requirement of 1 us can be met depends on clock synchronization accuracy notified by the network device and clock synchronization accuracy error (delta) of the terminal device, in the following, a timing relationship of clock synchronization between the terminal device and the network device is introduced in conjunction with FIG. 3, where FIG. 3 is a schematic diagram of a timing relationship of clock synchronization between a terminal device and a network device provided in an embodiment of the present application.

As shown in FIG. 3, there are some deviations in the clock synchronization between a clock of the network device and a clock of the terminal device, where the deviations in the clock synchronization are shown in an area indicated by the two arrows in FIG. 3, and depend on the clock synchronization accuracy notified by the network device and the clock synchronization accuracy error of the terminal device.

In a possible implementation manner, clock synchronization accuracy information and clock synchronization information notified by the network device may be included in a parameter (TimeReferenceInfo IE); the clock synchronization accuracy error of the terminal device may be determined by a physical layer, and the clock synchronization accuracy error thereof is related to many factors, e.g., propagation loss, device limitation, etc.

Based on the clock synchronization accuracy error described above, according to a liaison statement from the physical layer, in some scenarios, such as when a distance between a UE and a base station exceeds 200m, it is necessary to compensate a propagation delay between the terminal device and the network device, so that the clock synchronization accuracy error at the physical layer can be controlled within a required range, so as to finally ensure that the TSN service can meet the clock synchronization accuracy requirement of 1 us when propagating in 5G.

See a description about the physical layer cited below for details about LS:

"RAN1 has performed analysis on the achievable time synchronization accuracy over Uu interface. A timing synchronization error between a gNB and a UE no worse than 540 ns is achievable based on the RAN1 agreed evaluation assumptions for Rel-15 NR with 15 kHz SCS. It is RAN1's conclusion, that the synchronization accuracy is improved when using higher SCS. For small service areas with dense small cell deployments a propagation delay compensation by the UE would not be required. The propagation delay compensation needs to be applied by the TSN UEs for larger service areas with more sparse cell deployments (e.g. for inter-site distances >200m the gNB-to-UE timing synchronization accuracy without propagation delay compensation may be worse than 1 us)."

In general, based on the liaison statement of the physical layer and a conclusion of the radio access network (RAN), it is necessary to consider a method of realizing propagation delay compensation in a scenario where the distance between the terminal device and the network device is greater than 200 meters (m), so as to realize clock synchronization.

In a possible method to realize propagation delay compensation, for example, time alignment (TA) may be used for the propagation delay compensation, where the TA refers to that the terminal device sends data packets at a corresponding time in advance according to a corresponding instruction to realize the propagation delay compensation between the terminal device and the network device.

According to a current conclusion, the propagation delay compensation between the terminal device and the network device may be performed by the terminal device, for example, the terminal device determines a compensation value according to a TA value and realizes the propagation delay compensation according to the compensation value, and in general, the compensation value may be 0.5 TA or 0.5 Nta.

On the basis of the above embodiments, clock synchronization of TSN is introduced in the following:

in R16, only scenarios where a network device serves as a master TSN clock node are supported, accordingly, TSN clock information is notified to a terminal device by the network device, and the terminal device performs synchronization with the network device according to the received clock information;

in R17, scenarios where the terminal device serves as the master TSN clock node are further supported, when the terminal device serves as the master TSN clock node, a basic synchronization manner between the terminal device and the network device may still be that the terminal device performs 5G system synchronization with the network device, and the corresponding network device sends clock information.

Based on this assumption, and based on the TSN service transmission requirements described above, when a TSN service is transmitted in 5G, the terminal device and the network device need to perform clock synchronization, accordingly, the network device provides reference clock information to the terminal device to enable the terminal device and the network device to realize the clock synchronization.

Further, in order to meet the clock synchronization accuracy requirement of 1 us, the network device may send clock information to the terminal device, and the clock information may include, for example, TSN clock synchronization information and more accurate clock synchronization accuracy information, where the clock information may be included in a parameter TimeReferenceInfo IE.

In a possible implementation manner, the network device may send the clock information to the terminal device by broadcasting, for example, the network device sends system information such as SIBS to the terminal device by broadcasting, where the system information includes the clock information; or, the network device may also send clock information to the terminal device by unicasting, for example, the network device sends dedicated information such as dedicated RRC and DLinformationtransfer to the terminal device by unicasting, where the dedicated information includes the clock information;

where a granularity of clock synchronization accuracy is 10 nanoseconds (ns).

In conclusion, at present, a network device may send clock information to a terminal device through system information and dedicated information, so that the terminal device can perform clock synchronization according to the clock information, however, due to local oscillator of gNB and other reasons, clock drift may be caused, and considering time delays caused by different transmission manners of different information (system information and dedicated information), clock information sent by the network device to the terminal device through the system information and clock information sent by the network device to the terminal device through the dedicated information are caused to be different ultimately, in such case, it is still unknown which clock information the terminal device should use for clock synchronization.

Based on the problem introduced above, the present application proposes following technical concepts: performing clock synchronization according to first clock information or second clock information provided by a network device, that is, which clock information is used for synchronization is determined.

Figure 4:
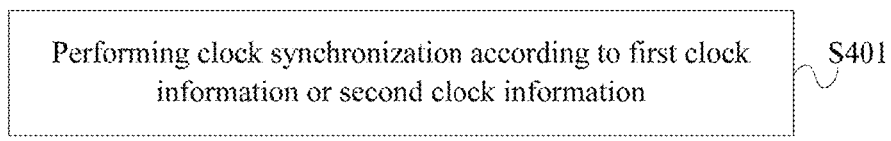
FIG. 4 is a first flowchart of a synchronization method provided in an embodiment of the present application.

The following describes the synchronization method provided in the present application in detail in conjunction with specific embodiments, first, it will be described in conjunction with FIG. 4, where FIG. 4 is a first flowchart of a synchronization method provided in an embodiment of the present application, and as shown in FIG. 4, the method includes:

S401, performing clock synchronization according to first clock information or second clock information.

In the present embodiment, the first clock information and the second clock information are information used by a terminal device to perform clock synchronization, where the first clock information is determined according to system information and the second clock information is determined according to dedicated information.

Taking the first clock information as an example, in a possible implementation manner, the first clock information may, for example, indicate that the terminal device performs propagation delay compensation; or, the first clock information may, for example, indicate that the terminal device does not perform the propagation delay compensation; or, the first clock information may, for example, indicate a condition under which the terminal device performs the propagation delay compensation; or, the first clock information may indicate whether the network device has made the propagation delay compensation; or, the first clock information may indicate whether a master clock node has made the propagation delay compensation; or, the first clock information may also, for example, not indicate information about propagation delay compensation.

Also taking the first clock information as an example, in a possible implementation manner, the first clock information may indicate, for example, a reference SFN, time corresponding to the reference SFN (such as which one of the clock, which minute and which second, etc.), a clock type of a reference, inaccuracy of the terminal device, etc.

An implementation manner of the second clock information is similar to that of the first clock information, and the present embodiment does not limit specific implementations of the first clock information and the second clock information, all information used by the terminal device for clock synchronization may be considered as the first clock information or the second clock information of the present embodiment, and the implementation manner thereof may be extended according to actual needs.

An implementation of clock synchronization by the terminal device is illustrated in the following, assuming that it is currently determined to perform the clock synchronization according to the first clock information, the terminal device performs the synchronization according to the first clock information.

Alternatively, assuming that it is currently determined to perform the clock synchronization according to the first clock information, and the first clock information indicates a first condition for the terminal device to perform propagation delay compensation, when the first condition is satisfied, the terminal device performs the propagation delay compensation to realize the clock synchronization between the terminal device and the network device.

In another possible implementation manner, it may also be determined to perform the clock synchronization according to the second clock information, and the present embodiment does not limit which clock information is used for the clock synchronization, as long as it can be determined that the clock synchronization is performed according to one of the first clock information or the second clock information.

Based on the above introduction, it can be determined that when system information and dedicated information exist at the same time, there is no effective solution to which clock information the terminal device should use for clock synchronization.

In the embodiment of the present application, by determining that the clock synchronization is performed according to the first clock information or the second clock information, it is possible to effectively determine an implementation manner of the terminal device for clock synchronization when the system information and the dedicated information exist at the same time, so as to ensure the clock synchronization between the network device and the terminal device.

On the basis of the above introduction, the synchronization method provided in the embodiments of the present application may further include two application scenarios, namely, a non-handover scenario and a handover scenario, where the non-handover scenario refers to that a connection has been established between a terminal device and a first network device; and the handover scenario refers to that a network device connected with the terminal device switches from the first network device to a second network device, in a possible implementation manner, during a moving process of the terminal device, it is necessary to switch from one small cell base station (usually referred to as a source base station, that is, the first network device in the present embodiment) to another small cell base station (usually referred to as a target base station, that is, the second network device in the present embodiment), such switching process is usually referred to as terminal device handover; or switch from one cell to another cell under one base station, that is, intra base station handover, which is also a handover scenario in the present embodiment.

Implementation manners of these two application scenarios are introduced in the following.

Figure 5:
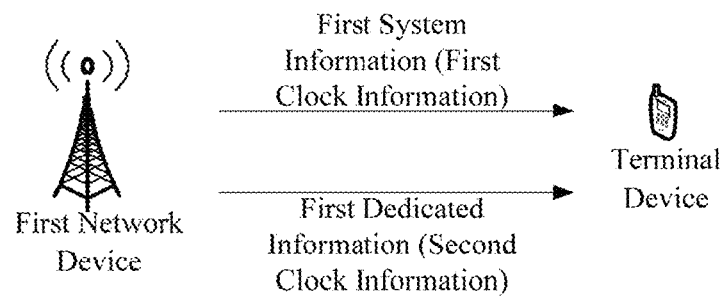
FIG. 5 is a schematic diagram of a non-handover scenario provided in an embodiment of the present application.

First, the non-handover scenario is introduced in conjunction with FIG. 5, where FIG. 5 is a schematic diagram of a non-handover scenario provided in an embodiment of the present application, and as shown in FIG. 5:

the terminal device may obtain first clock information and second clock information.

In a possible implementation manner, the terminal device may receive first system information from a first network device and obtain the first clock information according to the first system information.

Referring to FIG. 5, the terminal device may receive the first system information indicated by the first network device through broadcasting, where the first system information may be, for example, a system information block (SIB), where the broadcast first system information can be applicable to all terminal devices within the coverage of the first network device.

In addition, the terminal device may also receive first dedicated information from the first network device and obtain the second clock information according to the first dedicated information.

Referring to FIG. 5, the terminal device may receive the first dedicated information indicated by the first network device through unicasting, where the first dedicated information may be, for example, a dedicated radio resource control (RRC) message, e.g., DLinformationtransfer, where the second clock information indicated by the first network device to each terminal device within the coverage thereof through the first dedicated information may be different or the same.

Figure 6:
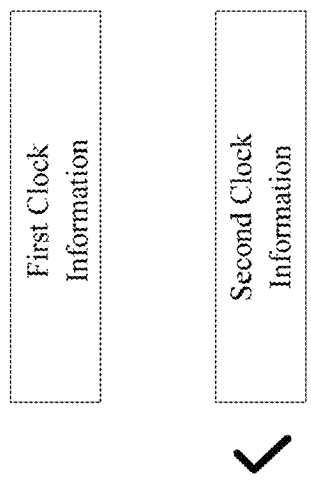
FIG. 6 is a first schematic diagram of determining clock information provided in an embodiment of the present application.
Figure 7:
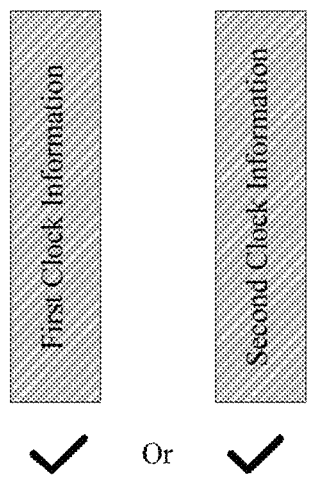
FIG. 7 is a second schematic diagram of determining clock information provided in an embodiment of the present application.
Figure 8:
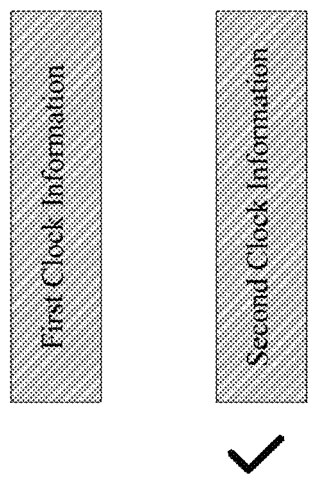
FIG. 8 is a third schematic diagram of determining clock information provided in an embodiment of the present application.
Figure 9:
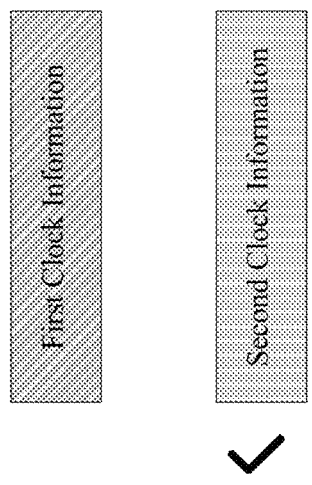
FIG. 9 is a fourth schematic diagram of determining clock information provided in an embodiment of the present application.
Figure 10:
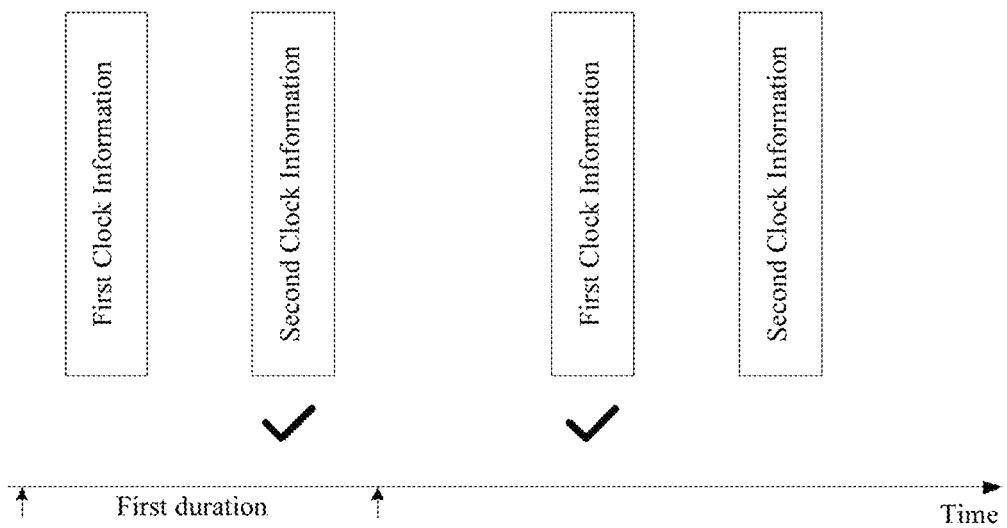
FIG. 10 is a fifth schematic diagram of determining clock information provided in an embodiment of the present application.

Based on the non-handover scenario described in FIG. 5, the terminal device obtains the first clock information through the first system information and obtains the second clock information through the first dedicated information, that is, the terminal device obtains clock information through both system information and dedicated information, and based on this, several possible implementation manners of clock synchronization according to the first clock information or the second clock information in a non-handover scenario will be introduced in conjunction with FIGS. 6 to 10 in the following, where FIG. 6 is a first schematic diagram of determining clock information provided in an embodiment of the present application, FIG. 7 is a second schematic diagram of determining clock information provided in an embodiment of the present application, FIG. 8 is a third schematic diagram of determining clock information provided in an embodiment of the present application, FIG. 9 is a fourth schematic diagram of determining clock information provided in an embodiment of the present application, and FIG. 10 is a fifth schematic diagram of determining clock information provided in an embodiment of the present application.

In a possible implementation manner, referring to FIG. 6, the terminal device performs synchronization according to the second clock information all the time.

That is, whatever the first clock information and the second clock information are, the second clock information included in the first dedicated information is used for clock synchronization all the time.

In another possible implementation manner, referring to FIG. 7, the first clock information and the second clock information are the same, and the terminal device may perform the clock synchronization according to either one of the first clock information or the second clock information.

In yet another possible implementation manner, referring to FIG. 8, the first clock information and the second clock information are the same, and the terminal device performs the clock synchronization according to the second clock information.

In another possible implementation manner, referring to FIG. 9, the first clock information and the second clock information are different, and the terminal device performs the clock synchronization according to the second clock information.

In another possible implementation manner, referring to FIG. 10, the clock synchronization is performed according to the second clock information within a first duration.

Further, when the first duration expires, the clock synchronization is performed according to the first clock information.

In the present embodiment, there is a plurality of implementation manners of the first duration, and various possible implementation manners of the first duration will be introduced in the following:

within the first duration refers to, for example, within valid time of the second clock information, or within the first duration may also refer to: before a timeout of a first timer.

The first duration may be indicated by the first system information; or the first duration may be indicated by first information; or the first duration may be indicated by the first dedicated information; or the first duration may be predefined.

The first information described above may be, for example, RRC, broadcast, media access control (MAC) control element (CE), or downlink control information (DCI).

In the present embodiment, the first clock information and/or the second clock information may further include a reference system frame number (SFN) or indicate the reference SFN; or, the first clock information and/or the second clock information may further include time (time, such as which one of the clock, which minute and which second, etc.).

Where a starting time point of the first duration in the present embodiment may be a position of the reference SFN, specifically, the position of the reference SFN may be any one of a boundary of the reference SFN, a starting point of the reference SFN, an end point of the reference SFN, and a first moment after the end point of the reference SFN (such as a first slot, a first SFN, and a first symbol); or the starting time point of the first duration is the position of the reference SFN plus a first delay; or the starting time point corresponding to the first duration is time when a handover is completed; or the starting time point corresponding to the first duration is time when a handover is completed minus the first delay; or the starting time point corresponding to the first duration is time when a handover is completed minus a second delay, where the second delay may be the first delay plus A, where A may be a handover duration, or A may also be a random access duration.

Besides, in the present embodiment, a first time point corresponding to the first dedicated information may also be determined according to the first dedicated information, where the first time point corresponding to the dedicated information includes at least one of the following:

a time point at which the first dedicated information including the second clock information is received, a time point at which the first dedicated information including the second clock information is decoded, and a time point at which configuration of the first dedicated information is enabled.

Then the starting time point corresponding to the first duration may also be the first time point; or the starting time point corresponding to the first duration may also be the first time point minus the first delay.

Where the first delay introduced above may be one of the following: an interface delay, a time period corresponding to the interface delay, and a sum of the interface delay and a transmission delay.

For example, the interface delay may be a delay of an XN interface (the delay of Xn interface, or S1 interface delay)

for sending clock information from the second network device to the first network device in a hand over (HO) scenario.

In another possible implementation manner, if the terminal device receives new second clock information within the first duration, for example, through receiving new first dedicated information (such as dedicated RRC), the terminal device may perform the clock synchronization according to the new second clock information.

In a possible implementation manner, the clock synchronization may be performed according to the new second clock information immediately after the new second clock information is received; or, the clock synchronization may be performed according to the new second clock information after the first duration with respect to time when the new second clock information is received.

Figure 11:
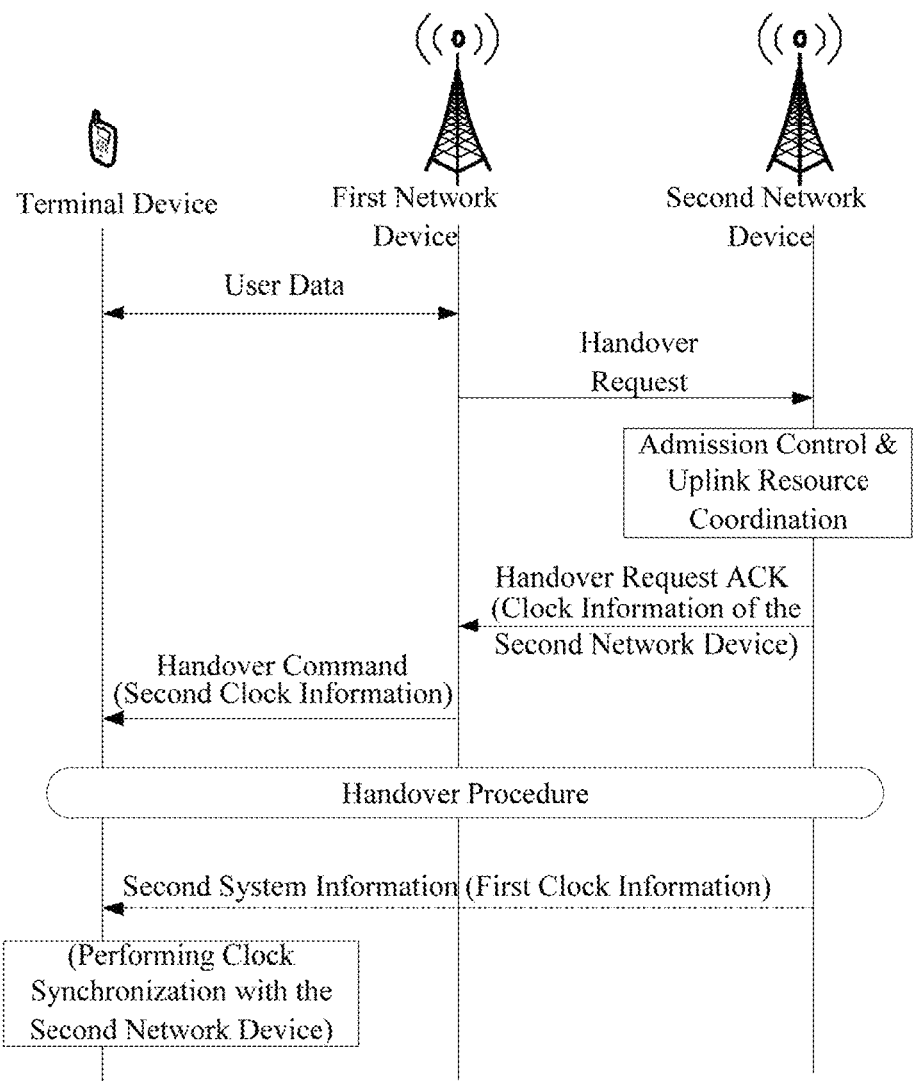
FIG. 11 is a schematic diagram of a non-handover scenario provided in an embodiment of the present application.

After introducing the implementations of the non-handover scenario, the handover scenario is introduced in the following in conjunction with FIG. 11, where FIG. 11 is a schematic diagram of a non-handover scenario provided in an embodiment of the present application, and as shown in FIG. 11:

assuming that a connection is established between a terminal device and a first network device, user data will be exchanged between the terminal device and the first network device, and assuming that the terminal device needs to be switched from the first network device to the second network device, then S1, the first network device sends a handover request to the second network device;

S2, the second network device performs admission control and uplink resource coordination according to the received handover request, so as to be ready to establish a connection with the terminal device;

S3, the second network device sends handover request acknowledge (ACK) to the first network device, where the handover request ACK carries clock information of the second network device;

S4, the first network device sends a handover command (HO command) to the terminal device according to the received handover request ACK, where the handover command includes the clock information of the second network device, and the HO command in the present embodiment is dedicated information, thus, what is specifically included in the handover command is second clock information;

in the present embodiment, the terminal device may store the second clock information;

S5, the terminal device, the first network device and the second network device perform a handover process; and S6, the terminal device performs clock synchronization with the second network device.

Referring to FIG. 11, it can be determined that, in another possible implementation manner, the terminal device may also receive first clock information from the second network device, where the first clock information may be, for example, sent by the second network device through second system information (such as SIB9).

Figure 12:
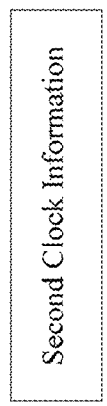
FIG. 12 is a sixth schematic diagram of determining clock information provided in an embodiment of the present application.
Figure 13:
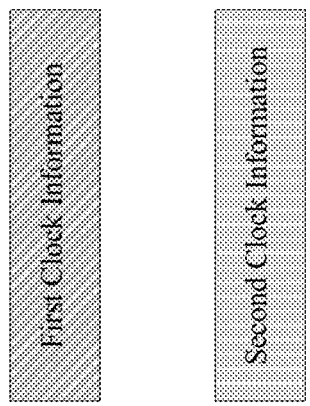
FIG. 13 is a seventh schematic diagram of determining clock information provided in an embodiment of the present application.
Figure 14:
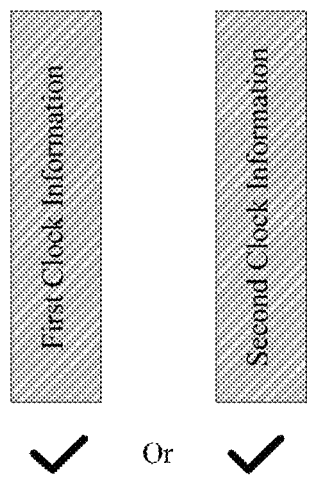
FIG. 14 is an eighth schematic diagram of determining clock information provided in an embodiment of the present application.
Figure 15:
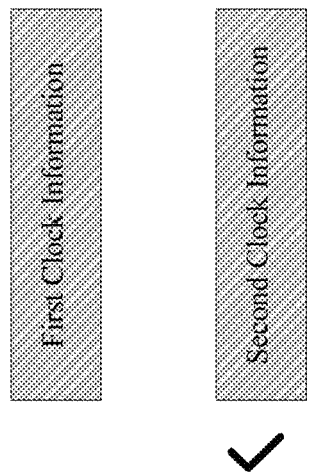
FIG. 15 is a ninth schematic diagram of determining clock information provided in an embodiment of the present application.
Figure 16:
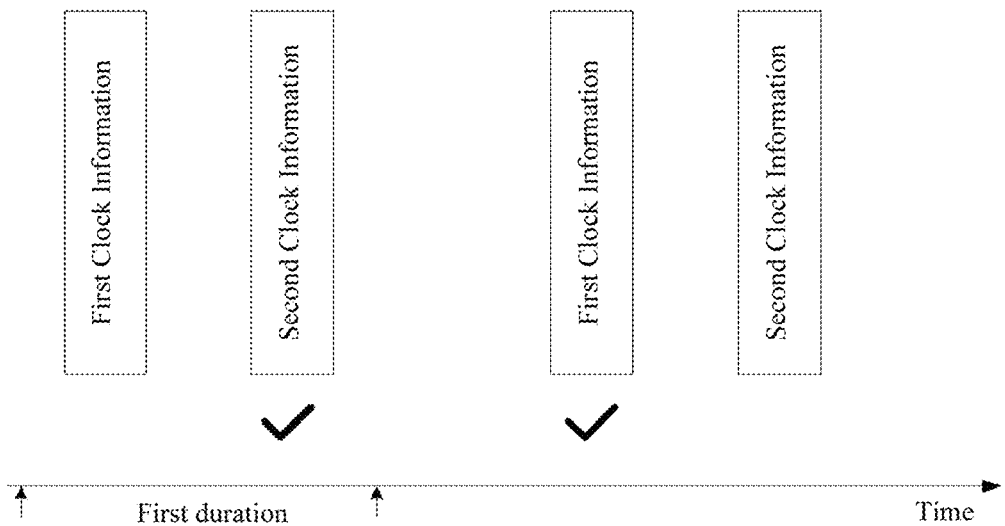
FIG. 16 is a tenth schematic diagram of determining clock information provided in an embodiment of the present application.

In the handover scenario of the present embodiment, when performing clock synchronization with the second network device, the terminal device may directly perform the clock synchronization according to the received second clock information, and does not need to receive the first clock information; or, the terminal device may also perform the clock synchronization according to the first clock information or the second clock information after receiving the first clock information and the second clock information, and various possible implementation manners in the handover scenario are introduced in conjunction with FIGS. 12 to 15 in the following, where FIG. 12 is a sixth schematic diagram of determining clock information provided in an embodiment of the present application, FIG. 13 is a seventh schematic diagram of determining clock information provided in an embodiment of the present application, FIG. 14 is an eighth schematic diagram of determining clock information provided in an embodiment of the present application, FIG. 15 is a ninth schematic diagram of determining clock information provided in an embodiment of the present application, and FIG. 16 is a tenth schematic diagram of determining clock information provided in an embodiment of the present application.

Performing clock synchronization according to the received second clock information directly will be introduced first:

in a possible implementation manner, referring to FIG. 12, the terminal device may receive second dedicated information, obtain the second clock information according to the second dedicated information, and directly perform the clock synchronization according to the second clock information, or the terminal device may use the second clock information to perform synchronization with the second network device after obtaining the second clock information for a second duration; that is, it is not necessary to obtain the first clock information at this time.

In a possible implementation manner of the present embodiment, referring to the scenario introduced in FIG. 11 above, the second dedicated information may be a handover command (HO command), and the second clock information may be carried in the handover request ACK or other interface messages, that is, the second clock information may be obtained through the second network device; or, the second dedicated information may also be any information used to send the second clock information, and the present embodiment does not limit the implementation manner of the second dedicated information.

Then, performing clock synchronization according to the first clock information or the second clock information after receiving the first clock information and the second clock information is introduced.

In another possible implementation manner, in addition to obtaining the second clock information, the terminal device further obtains the first clock information according to the second system information of the second network device, where the second system information may be, for example, SIB9, that is, the first clock information and the second clock information exist at the same time currently.

It can be understood that the first clock information and the second clock information may be the same or different, and based on this, there may be a plurality of implementations.

Referring to FIG. 13, the first clock information and the second clock information are different, and the clock synchronization may be performed according to the first clock information.

It should be noted here that in a HO process, the second dedicated information is forwarded through an XN/S1 interface, there is a delay X in a forwarding process of the XN/S1 interface, and the second clock information may change during this delay X, thus, when the first clock information and the second clock information are different, the second clock information notified by the second dedicated information cannot be used for synchronization, but the clock synchronization is performed according to the first clock information to ensure accuracy of the clock synchronization.

In another possible implementation manner, with the first clock information and the second clock information, the second network device may further send third dedicated information to the terminal device additionally, where the third dedicated information may be, for example, a dedicated RRC message, e.g., DLinformationtransfer, at this time, the terminal device may perform the clock synchronization according to clock information in the third dedicated information, and before receiving the third dedicated information, the terminal device may still obtain clock information in a manner of broadcasting or handover command, and perform the synchronization according to the clock information.

Where the third dedicated information is directly sent by the second network device to the first network device without being forwarded through the XN interface, thus, the delay X can be avoided, the accuracy of the clock synchronization is thus ensured.

Alternatively, referring to FIG. 14, the first clock information and the second clock information are the same, and the clock synchronization may be performed according to either one of the first clock information or the second clock information; or referring to FIG. 15, the first clock information and the second clock information are the same, and the clock synchronization may be performed according to the second clock information.

In the present embodiment, the terminal device may receive the second system information from the second network device in following cases:

receiving during a handover process of the terminal device; or receiving after completion of handover of the terminal device; or receiving after success of a random access process of the terminal device.

Where the completion of the handover refers to completion of network device handover, and the success of the random access process refers to completion of the random access process between the terminal device and the second network device, and the handover process therein may include at least one of the following:

the terminal device obtains system target SFN information during the handover process, the terminal device obtains or reads SFN information of the second network device during the handover process (then, a SFN of the second network device is used as the reference), and the terminal device takes a system frame number SFN of the first network device as the reference.

In another possible implementation manner, the first duration may also be used to determine which clock information is used for clock synchronization in the handover scenario.

Referring to FIG. 16, the clock synchronization is performed according to the second clock information within the first duration. Further, when the first duration expires, the clock synchronization is performed according to the first clock information.

In the present embodiment, there is a plurality of implementation manners of the first duration, and various possible implementation manners of the first duration will be introduced in the following:

within the first duration refers to, for example, within valid time of the second clock information, or within the first duration may also refer to: before a timeout of a first timer.

The first duration may be indicated by the second system information; or the first duration may be indicated by first information; or the first duration may be indicated by the second dedicated information; or the first duration may be predefined.

The first information described above may be, for example, RRC, broadcast, MAC CE, and DCI.

In the present embodiment, the first clock information and/or the second clock information may further include a reference SFN or indicate the reference SFN; or, the first clock information and/or the second clock information may further include time (time, such as which one of the clock, which minute and which second, etc.).

Where a starting time point of the first duration in the present embodiment may be a position of the reference SFN, specifically, the position of the reference SFN may be any one of a boundary of the reference SFN, a starting point of the reference SFN, an end point of the reference SFN, and a first moment after the end point of the reference SFN (such as a first slot, a first SFN, and a first symbol); or the starting time point of the first duration is the position of the reference SFN plus a first delay; or the starting time point corresponding to the first duration is time when a handover is completed; or the starting time point corresponding to the first duration is time when a handover is completed minus the first delay; or the starting time point corresponding to the first duration is the time when a handover is completed minus a second delay, where the second delay may be the first delay plus A, where A may be a handover duration, or A may also be a random access duration.

Besides, in the present embodiment, a first time point corresponding to the second dedicated information may also be determined according to the second dedicated information, where the first time point corresponding to the dedicated information includes at least one of the following:

a time point at which the second dedicated information including the second clock information is received, a time point at which the second dedicated information including the second clock information is decoded, and a time point at which configuration of the second dedicated information is enabled.

Then the starting time point corresponding to the first duration may also be the first time point; or the starting time point corresponding to the first duration may also be the first time point minus the first delay.

Where the first delay introduced above may be one of the following: an interface delay, a time period corresponding to the interface delay, and a sum of the interface delay and a transmission delay.

For example, the reception delay may be a delay of an XN interface (the delay of Xn interface, or S1 interface delay) for sending clock information from the second network device to the first network device in a handover (HO) scenario.

In another possible implementation manner, if the terminal device receives new second clock information within the first duration, for example, through receiving new first dedicated information (such as dedicated RRC), the terminal device may perform the clock synchronization according to the new second clock information.

In a possible implementation manner, the clock synchronization may be performed according to the new second clock information immediately after the new second clock information is received; or, the clock synchronization may be performed according to the new second clock information after the first duration with respect to time when the new second clock information is received.

It can be understood that the implementation manner of determining the clock information according to the first duration described above is similar in the handover scenario and the non-handover scenario, and difference thereof is that manners of obtaining the first clock information and the second clock information may be different in different scenarios.

In conclusion, the synchronization method provided in the present embodiment provides a method for determining clock information used by a terminal device while performing clock synchronization, and defines behaviors of the terminal device, so as to ensure the clock synchronization between the terminal device and a network device, and ensure synchronization requirements of the terminal device and transmission requirements of TSC services.

Figure 17:
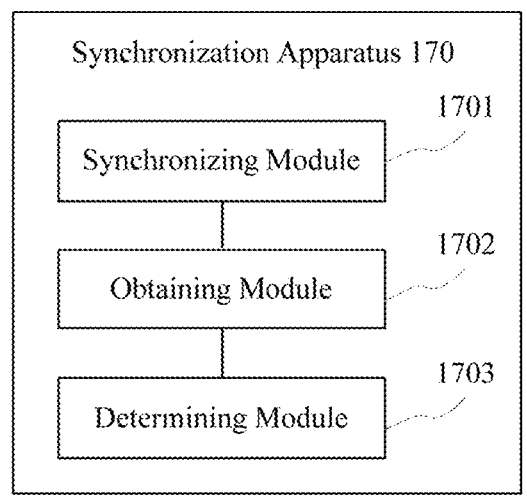
FIG. 17 is a structural diagram of a synchronization apparatus provided in an embodiment of the present application.

FIG. 17 is a structural diagram of a synchronization apparatus provided in an embodiment of the present application. Referring to FIG. 17, the synchronization apparatus 170 may include a synchronizing module 1701, an obtaining module 1702, and a determining module 1703, where, the synchronizing module 1701 is configured to perform clock synchronization according to first clock information or second clock information.

In a possible implementation manner, the first clock information and the second clock information are information used by a terminal device to perform the clock synchronization.

In a possible implementation manner, the terminal device is connected with a first network device.

In a possible implementation manner, the apparatus further includes: the obtaining module 1702;

where the obtaining module 1702 is configured to obtain the first clock information and the second clock information.

In a possible implementation manner, the obtaining module 1702 is specifically configured to:

receive first system information from the first network device and obtain the first clock information according to the first system information; and receive first dedicated information from the first network device and obtain the second clock information according to the first dedicated information.

In a possible implementation manner, the synchronizing module 1701 is specifically configured to:

perform the clock synchronization according to either one of the first clock information or the second clock information.

In a possible implementation manner, the first clock information and the second clock information are the same, and the synchronizing module 1701 is specifically configured to:

perform the clock synchronization according to the second clock information.

In a possible implementation manner, the first clock information and the second clock information are different, and the synchronizing module 1701 is specifically configured to:

perform the clock synchronization according to the second clock information.

In a possible implementation manner, the terminal device is switched from the first network device to a second network device.

In a possible implementation manner, the obtaining module 1702 is further configured to:

receive second dedicated information, and obtaining the second clock information according to the second dedicated information.

In a possible implementation manner, the second dedicated information is a handover command.

In a possible implementation manner, the second clock information is obtained through the second network device.

In a possible implementation manner, the second clock information is carried in handover request acknowledge ACK, where the handover request ACK is sent by the second network device to the first network device.

In a possible implementation manner, the synchronizing module 1701 is specifically configured to:

perform the clock synchronization according to the second clock information.

In a possible implementation manner, the obtaining module 1702 is further configured to:

obtaining the first clock information according to second system information of the second network device.

In a possible implementation manner, the second system information is received during a handover process of the terminal device; or the second system information is received after completion of handover of the terminal device; or the second system information is received after success of a random access process of the terminal device.

In a possible implementation manner, the handover process of the terminal device includes at least one of the following:

the terminal device obtains system target SFN information during the handover process, the terminal device obtains or reads SFN information of the second network device during the handover process, and the terminal device takes a system frame number SFN of the first network device as a reference.

In a possible implementation manner, the synchronizing module 1701 is specifically configured to:

perform the clock synchronization according to the first clock information.

In a possible implementation manner, the synchronizing module 1701 is specifically configured to:

perform the clock synchronization according to either one of the first clock information or the second clock information; or, perform the clock synchronization according to the second clock information.

In a possible implementation manner, the synchronizing module 1701 is specifically configured to:

performing the clock synchronization according to the second clock information within a first duration;

when the first duration expires, performing the clock synchronization according to the first clock information.

In a possible implementation manner, the obtaining module 1702 is further configured to:

receive, by the terminal device, new second clock information within the first duration.

In a possible implementation manner, the synchronizing module 1701 is specifically configured to:

perform the clock synchronization according to the new second clock information.

In a possible implementation manner, the synchronizing module 1701 is specifically configured to:

perform the clock synchronization according to the new second clock information after receiving the new second clock information; or, perform the clock synchronization according to the new second clock information after the first duration.

In a possible implementation manner, the first duration is indicated by system information; or the first duration is indicated by first information; or the first duration is indicated by dedicated information.

In a possible implementation manner, the first clock information and/or the second clock information further include a reference SFN; or the first clock information and/or the second clock information further indicate a reference SFN.

In a possible implementation manner, a starting time point corresponding to the first duration is a position of the reference SFN.

In a possible implementation manner, the starting time point corresponding to the first duration is the position of the reference SFN plus a first delay.

In a possible implementation manner, the apparatus further includes: the determining module 1703;

where the determining module 1703 is configured to determine a first time point corresponding to the dedicated information according to the dedicated information.

In a possible implementation manner, the first time point corresponding to the dedicated information includes at least one of the following:

a time point at which the dedicated information including clock information is received, a time point at which the dedicated information including the clock information is decoded, and a time point at which configuration of the dedicated information is enabled.

In a possible implementation manner, the starting time point corresponding to the first duration is the first time point; or a starting time point corresponding to the first duration is the first time point minus the first delay.

In a possible implementation manner, the starting time point corresponding to the first duration is when the handover is completed.

In a possible implementation manner, the starting time point corresponding to the first duration is time when a handover is completed minus the first delay.

In a possible implementation manner, the first delay is one of the following: an interface delay, a time period corresponding to the interface delay, and a sum of the interface delay and a transmission delay.

The synchronization apparatus provided in the embodiments of the present application can implement the technical solutions shown in the above method embodiments, and implementation principles and beneficial effects thereof are similar, which will not be repeated here.

Figure 18:
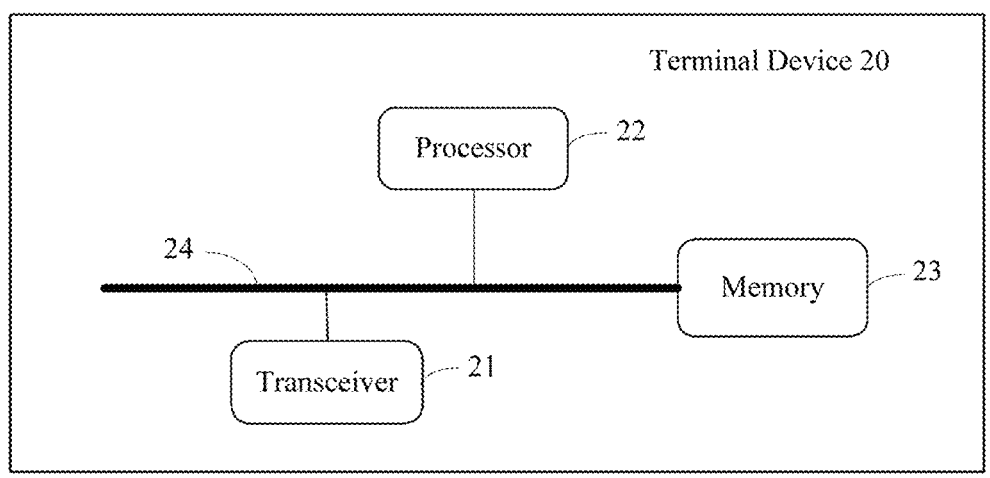
FIG. 18 is a structural diagram of a terminal device provided in an embodiment of the present application.

FIG. 18 is a structural diagram of a terminal device provided in an embodiment of the present application. Referring to FIG. 18, the terminal device 20 may include a transceiver 21, a memory 23, and a processor 22. The transceiver 21 may include: a transmitter and/or a receiver. The transmitter may also be referred to as a sender, a sending set, a sending port, or a sending interface and the like, and the receiver may also be referred to as a receiver, a receiving set, a receiving port, or a receiving interface and the like. For example, the transceiver 21, the memory 23, and the processor 22 are connected to each other through a bus 24.

The memory 23 is configured to store a program instruction;

the processor 22 is configured to execute the program instruction stored in the memory to enable the terminal device 20 to execute any of the synchronization methods shown above.

Where the receiver of the transceiver 21 may be configured to perform receiving functions of the terminal device in the above synchronization methods.

The embodiments of the present application provide a computer readable storage medium, and the computer readable storage medium stores a computer executable instruction which, when being executed by a processor, is used to realize the communication methods described above.

The embodiments of the present application may further provide a computer program product, and the computer program product may be executed by a processor and can realize any of the synchronization methods executed by a terminal device as described above when being executed.

The synchronization device, the computer readable storage medium and the computer program product of the embodiments of the present application can execute the synchronization methods executed by the terminal device, and reference can be made to the above description for specific implementation processes and beneficial effects, which will not be repeated here.

In the several embodiments provided in the present application, it should be understood that the disclosed systems, apparatuses, and methods may be implemented in other manners. For example, the apparatus embodiments described above are merely illustrative, for example, the division of the units is only a logical function division, and in an actual implementation, there may be another division manner, for example, a plurality of units or components may be combined or may be integrated into another system, or some features may be ignored or not executed. In addition, a mutual coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to a plurality of network units. Some or all of the units may be selected according to actual needs to achieve the purpose of solutions of the present embodiments.

In addition, functional units in the embodiments of the present application may be integrated into one processing unit, or each of the units may exist alone physically, or two or more units may be integrated in one unit. The above integrated units may be realized in a form of hardware or a software functional unit.

Person skilled in the art can understand that all or part of the steps to realize the above method embodiments may be carried out by hardware related to a program instruction. The aforementioned computer program may be stored in one computer readable storage medium. When the computer program is executed by a processor, the steps of the above method embodiments are implemented; and the aforementioned storage medium includes read only memory (ROM), random access memory (RAM), magnetic disc or optical disc and other media that can store program codes.

Finally, it should be noted that the above embodiments are only used to describe technical solutions of the present application, but not to limit thereto; although the present application has been described in detail with reference to the foregoing embodiments, person skilled in the art should understand that the technical solutions described in the foregoing embodiments may still be modified, or some or all of the technical features may be equivalently substituted; and these modifications or substitutions do not make essence of corresponding technical solutions deviate from the scope of the technical solutions of various embodiments of the present application.

What is claimed is:

1. A synchronization method, applied to a terminal device, the synchronization method comprising:
   obtaining the first clock information and the second clock information; and
   performing clock synchronization according to first clock information or second clock information;
   wherein the obtaining the first clock information and the second clock information. comprises:
   receiving first system information from a first network device and obtaining the first clock information according to the first system information; and
   receiving first dedicated information from the first network device and obtaining the second clock information according to the first dedicated information;
   wherein the performing the clock synchronization according to the first clock information or the second clock information, comprises:
   if the first clock information and the second clock information are different. performing the clock synchronization according to the second clock information.

2. The method according to claim 1, wherein the first clock information and the second clock information are information used by the terminal device to perform the clock synchronization.

3. The method according to claim 1, wherein the first clock information indicates whether a network device has made a propagation delay compensation.

4. The method according to claim 1, wherein the first clock information indicates a reference system frame number (SFN), time corresponding to the reference SFN, a clock type of a reference, or inaccuracy of the terminal device.

5. A synchronization apparatus, applied to a terminal device, the synchronization apparatus comprising: a transceiver, a processor and a memory;
   the memory stores a computer executable instruction;
   the processor executes the computer executable instruction stored in the memory to enable the processor to:
   obtain the first clock information and the second clock information; and
   perform clock synchronization according to first clock information or second clock information;
   wherein the processor is further enabled to:
   control the transceiver to receive first system information from a first network device and obtain the first clock information according to the first system information; and
   control the transceiver to receive first dedicated information from the first network device and obtain the second clock information according to the first dedicated information;
   wherein the processor is further enabled to:
   if the first clock information and the second clock information are different, perform the clock synchronization according to the second clock information.

6. The apparatus according to claim 5, wherein the first clock information and the second clock information are information used by the terminal device to perform the clock synchronization.

7. The apparatus according to claim 5, wherein the first clock information indicates whether a network device has made a propagation delay compensation.

8. The apparatus according to claim 5, wherein the first clock information indicates a reference system frame number (SFN), time corresponding to the reference SFN, a clock type of a reference, or inaccuracy of the terminal device.

9. A non-transitory computer readable storage medium, wherein the computer readable storage medium stores a computer executable instruction which, when being executed by a processor, is used to enable the processor to:
   obtain the first clock information and the second clock information; and
   perform clock synchronization according to first clock information or second clock information;
   wherein the processor is further enabled to:
   control a transceiver to receive first system information from the a first network device and obtain the first clock information according to the first system information; and
   control the transceiver to receive first dedicated information from the first network device and obtain the second clock information according to the first dedicated information;
   wherein the processor is further enabled to:
   if the first clock information and the second clock information are different, perform the clock synchronization according to the second clock information.

10. The non-transitory computer readable storage medium according to claim 9, wherein the first clock information and the second clock information are information used by the terminal device to perform the clock synchronization.

11. The non-transitory computer readable storage medium according to claim 9, wherein the first clock information indicates whether a network device has made a propagation delay compensation.

12. The non-transitory computer readable storage medium according to claim 9, wherein the first clock information indicates a reference system frame number (SFN), time corresponding to the reference SFN, a clock type of a reference, or inaccuracy of the terminal device.

* * * * *